3,258,391
CHEMICAL RECOVERY IN PULP MANUFACTURE
Conrad F. Cornell, Salt Lake City, Utah, and Donald A. Dahlstrom, Deerfield, Ill., assignors to The Eimco Corporation, Salt Lake City, Utah, a corporation of Delaware
Continuation of abandoned application Ser. No. 133,833, Aug. 25, 1961. This application Apr. 1, 1965, Ser. No. 446,480
6 Claims. (Cl. 162—30)

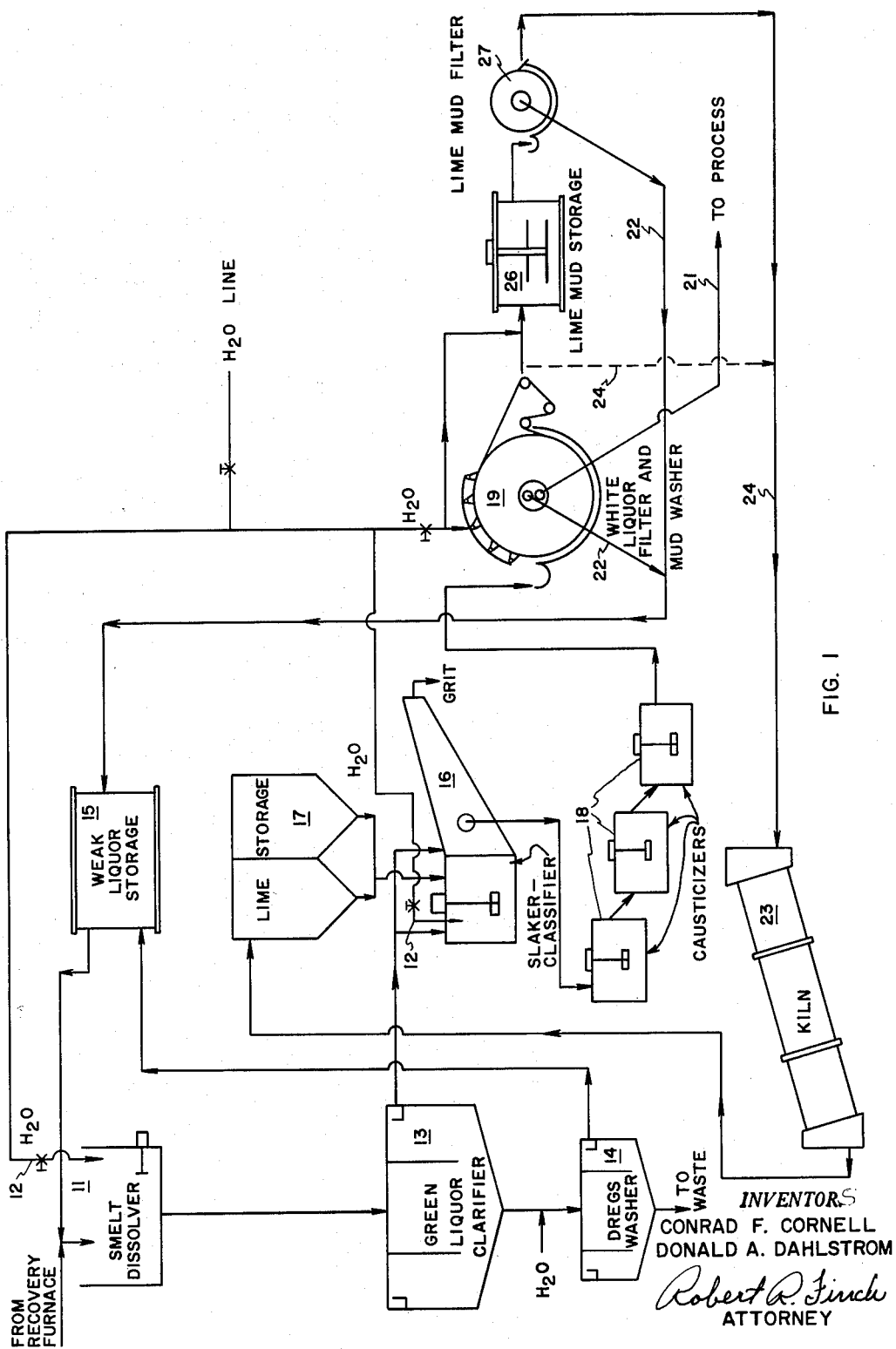

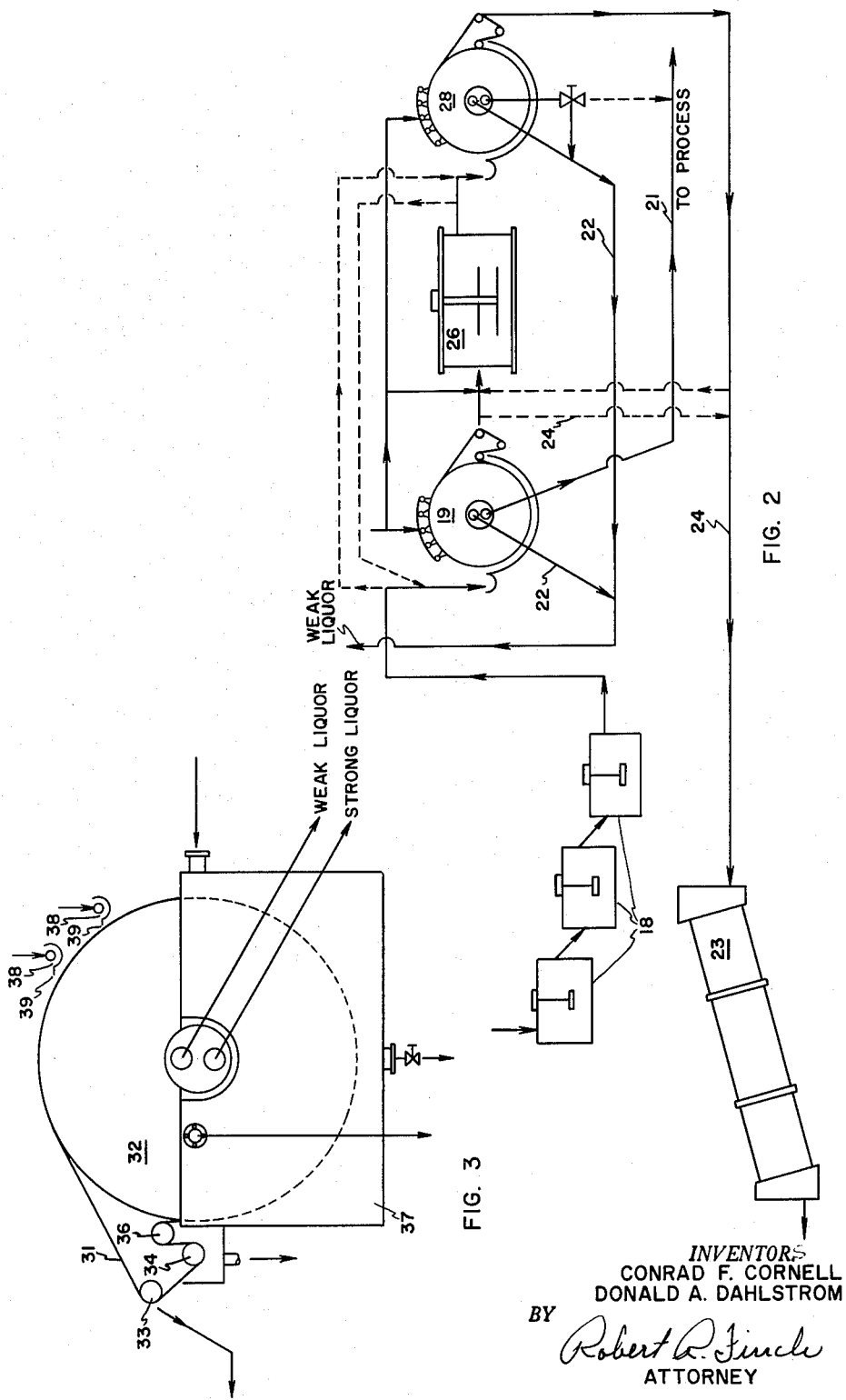

This is a continuation of application Serial No. 133,833 filed August 25, 1961, now abandoned.

This invention relates generally to the field of paper making and in particular to the so-called chemical recovery and recausticizing step in which chemicals are recovered for reuse in the pulping or digesting process.

In the so-called kraft or sulphate process, fibers are liberated from wood by dissolving the lignin binder in a caustic solution in the presence of sodium sulphide. The compounds utilized in the process are expensive and the process is economical only if proper recovery and reuse methods are employed.

Briefly, the chemical recovery and recausticizing system involves the following steps: the liquor resulting from the digestion process, called black liquor, is concentrated by evaporation, the concentrate is mixed with make-up salt and then smelted to burn off the organics and reduce the make-up salt ($Na_2SO_4$) to $Na_2S$. The resulting smelt is then dissolved to produce a so-called green liquor which is in turn causticized with slaked lime to produce caustic in accordance with the equation:

$$Na_2CO_3 + Ca(OH)_2 \rightarrow 2NaOH + CaCO_3$$

The resulting calcium carbonate is separated from the caustic solution, the caustic is re-used in digestion and the carbonate burned to produce CaO which is subsequently slaked and re-used in the causticizing reaction.

The present invention concerns itself primarily with the recausticizing step and recovery of the lime and soda for further use.

A basic problem in this type operation is separation of the calcium carbonate from the caustic (white liquor) solution. For many years it has been the practice to conduct this separation in clarifiers, notably tray clarifiers which utilize a plurality of compartments in a single unit. Clarifier effluent is utilized in the digestion process while the underflow or mud is subjected to further processing in a sedimentation type apparatus to effect recovery of residual soda by dilution washing. The wash effluent, called weak liquor, may be utilized in the smelt dissolver and the wash mud usually held in storage whence it is filtered for dewatering thence supplied to a kiln for burning to CaO.

It has long been known that great economy and increased efficiency could be obtained if it were possible to separate calcium carbonate from caustic immediately following the causticizing step. This would permit elimination of both the white liquor clarifier and mud washer. Consequently, many attempts have heretofore been made to subject the causticizer discharge to direct filtration. However, all such attempts have proven commercially unfeasible because of a variety of problems. One such problem has resided in the inability to filter at a sufficiently high rate and filtrate clarity to warrant the cost of filtration equipment and operation. Another difficulty has been the inability to properly wash the carbonate to effect sufficient reduction in its soda content.

The present invention is predicated on the discovery that by subjecting the causticizer discharge to filtration under certain critically controlled conditions of submergence, reduced wash time and volume, and cake formation time, a totally unexpected efficiency of filtration is obtainable. Such technique yields a highly washed cake, at least equivalent to that obtainable by the cumbersome dilution type wash; and a cake for kiln feed of an extremely low moisture content in the range of about 35% from a single stage filtration. Significantly, the lower volume wash frees process water for use in other portions of the flow sheet where it is more effective, such as in the smelt dissolver or slaker.

Elimination of the white liquor clarifier and mud washer not only reduces equipment cost but also results in a significant saving of space as well as material tied up in process.

It is therefore a primary object of the present invention to provide an improved chemical recovery and recausticizing system in which separation of calcium carbonate from the caustic solution is effected by direct filtration of the causticizer discharge.

A further object is the provision of ways and means, in particular a unique filtration technique, enabling such continuous separation with a reduced quantity of wash water which yields a fully washed cake of reduced soda and moisture content while saving on the quantity of wash water used at this stage for diversion to the other portions of the process.

Another problem of very serious nature encountered in prior efforts at direct filtration of white liquor, is the build-up of a carbonated deposit in filtration equipment which necessitated frequent shut down for clean out.

It is a further object of the present invention to provide a filtration method by which problems due to carbonate build-up are eliminated.

In order that the invention may be more readily understood and carried into effect, reference is made to the accompanying drawings which illustrate preferred embodiments of the invention and which are offered by way of illustration and not in limitation of the invention, the scope of which is defined by the appended claims.

In the drawings:

FIG. 1 is a simplified flow sheet showing a preferred embodiment of the chemical recovery and recausticizing system of the present invention.

FIG. 2 is a flow sheet of another embodiment of the invention useful under different conditions.

FIG. 3 is a simplified view showing the general configuration of a filter especially designed for use in the present invention.

In FIG. 1 the flow sheet shows burned material from a recovery furnace going into a smelt dissolver 11 where it is dissolved in weak white liquor and/or water. From the smelt dissolver, the resulting green liquor is transferred to a green liquor clarifier 13 where the dregs (solid impurities) are separated by sedimentation. From the clarifier, dregs are removed to a conventinal dregs washer 14 and, after washing, are sent to waste. Weak liquor from the washer is sent to a weak liquor storage tank 15 while the strong effluent green liquor from clarifier 13 is transferred to a slaker 16 where it contacts fresh quick lime (CaO) from a lime storage bin 17. Grit is discharged from the slaker while the mixture of slaked lime and green liquor comprising the slaker over flow is passed to a causticizer station 18 in which the causticizing reaction between the slaked lime and green liquor is carried substantially to completion. Water addition pipes 12 are provided for adding fresh water to the slaker 16 or smelt dissolver 11, such water addition being enabled by the low wash water requirements of the invention. Discharge from the causticizer is sent directly to a filter 19 where the calcium carbonate is recovered as is more fully described hereinafter. From the filter, strong white liquor is sent directly to process via a suitable conduit 21 while weak liquor, resulting from the wash operation, is sent to weak liquor storage via a conduit 22. Washed and dewatered filter cake is conveniently sent directly to kiln 23 via any suitable conveyance, generally designated 24. In order to provide flexibility and accommodate variation in mud availability, there is conveniently provided a mud storage unit 26 into which cake may be discharged and, after suitable dilution, held in an agitated condition. If desired, the mud storage unit 26, may be replaced with a simple repulser as there is really no need for storage in the continuous system of the present invention. From the mud storage, mud may be refiltered on a conventional filter 27 and then supplied via suitable transport 24 to the kiln 23. Filtrate from the second filter 27 is transferred via suitable conduit 22 into the weak liquor storage compartment 15 for subsequent use. Calcium carbonate is calcined in the kiln to yield CaO which is stored in bin 17.

The flow sheet of FIG. 2 is similar to that of FIG. 1 but is simplified to eliminate the smelt dissolver, green liquor clarifier, dregs washer and slaker which would be the same as in FIG. 1. Like reference numerals are used to designate similar elements.

Note that in the flow sheet of FIG. 2, two special high submergence filters are utilized in series with the normal situation being shown in solid lines wherein cake from the second filter 28 comprises feed to the kiln. The lime mud storage unit is normally used as a simple repulper which receives cake from the first filter 19 repulps it and discharges it directly to the second filter 28. The two-stage filtration yields a more thoroughly dewatered cake with the result that the kiln feed may contain as low as 30% moisture with a consequent reduction in fuel costs.

In the event of mechanical trouble in either filter, the cake can be discharged directly from the other filter to the kiln as in a single stage operation. This is shown by the dotted line whereby the cake from the first filter 19 may be transmitted directly to the kiln or the feed to such filter may be bypassed directly to the second filter 28. Provision is also made for discharge of the cake into the mud storage tank 26 for recycle to the first filter. This gives storage if desired and also results in better filtration of the carbonate.

In FIG. 3, there is shown a simplified sketch of a filter especially adapted for the process of the present invention. The filter, generally designated 19, corresponds to filters 19 and 28 of FIGS. 1 and 2.

The illustrated filter is of the vacuum drum type in which the filter medium is in the form of an endless web 31 which passes successively over the drum 32 thence over spaced rolls 33, 34 and 36 to return to the drum. Cake is discharged during passage over roll 33; and the web is washed and corrective alignment effected prior to return to the drum. Filters of this type, as exemplified by the filter manufactured by the Eimco Corporation of Salt Lake City, Utas, under the trademark, EimcoBelt, possesses the distinct advantage of presenting a continuously clean filter medium during continuous operation.

Particular attention is directed to the high degree of submergence of the drum 32 in the feed tank 37. In this connection, it is of great importance that the drum be submerged to a high degree in the range of from 40% to 60% at all times during operation. It is also critical that the rotational speed of the drum be correlated to the percent submergence to attain the required cake thickness and resultant filtrate clarity. Preferably the feed mixture is agitated to maintain the calcium carbonate in suspension in the caustic and thereby prevent undue sedimentation within the feed tank.

The high submergence is important for several reasons the most important of which include cake formation, filtration capacity and proper conditioning of the cake for flood or displacement washing in minimum time with low water consumption and minimum air exposure. In general, form time must be sufficient to form a cake in the region from ¼" to ¾" thickness to yield a filtrate of average clarity below 100 p.p.m. suspended solids. The submergence and cycle rate must be sufficient that the formed cake will progress far enough toward the top of the cycle to permit washing before cake cracking occurs.

The importance of the wash of the present invention should not be overlooked because it presents several distinct advantages. Displacement washing results in a thoroughly washed cake containing less than 1.0%; and usually about 0.4% $Na_2O$, providing maximum soda recovery at an extremely low water consumption and in a very short time.

These latter features are themselves important for several reasons. First, the low water consumption (in the neighborhood of 0.2 gallons per pound of dry solids) permits addition of water to other stages of the process, such as the smelt dissolver or slaker, where greater advantages can be derived. Second, and this is of great importance, the filtrate liquor is not diluted to the point where the causticizing reaction is pushed further toward completion with resulting additional precipitation of $CaCO_3$. Third, displacement or flood washing immediately following cake formation prevents contact between strong white liquor which contains excess CaO, and air, which contains $CO_2$, thereby avoiding $CaCO_3$ or scale formation occasioned by reaction between these compounds in the filter valves and piping.

Regarding the wash operation, it will be noted that wash water or wash liquor is applied in a flooding type action immediately after the cake emerges from the feed tank and before the filtrate lines are cleared of a strong liquor. Because of the combination of high submergence, residual strong liquor and location of the flood wash there is no opportunity for the cake to crack or for air to contact the strong liquor in the piping or valve; also the cake is moving toward the horizontal position thereby enabling the wash water distribution from wash box 38 over distributing weir 39 to flood the cake and be drawn therethrough in a displacement action. The exact manner of applying the wash water is critical in that it must be applied in a fashion to substantially exclude air and effect displacement of strong liquor from the cake. Both the weir arrangement shown in FIG. 3 and the continuous sprays shown in FIGURES 1 and 2 have been used with success, however, the weir is to be preferred because of its greater ability to lay down a sheet of water to exclude air.

As noted above, residual strong liquor in the filtrate lines at the time of wash application is important as this provides material to keep the lines filled during the change over in the valving from strong liquor removal (conduit 21) to weak liquor removal (conduit 22) which insures a constant strength of strong liquor undiluted by wash water. This also aids in excluding air. This is made possible by the ability of the filter to recover more strong liquor from the causticizer overflow than is possible in prior sedimentation systems; and it is this excess that is used to keep the filter full.

The quantity of residual strong liquor is quite substantial and could also be utilized in process if desired. For instance, in a typical plant producing 250 metric tons per day of unbleached kraft softwood pulp (bone dry basis) the causticizer overflow averages 231 g.p.m. If subjected to sedimentation clarification the total strong white liquor produced is 181 g.p.m. which is sent to process. However, in the filtration of the present invention, the total strong white liquor production is about 211 g.p.m. (due to greater dewatering). This gives an excess of 30 g.p.m. for use in the filter to block air entry and avoid production liquor dilution. Obviously the excess can be used in process if desired.

As previously mentioned, this invention is predicated on the discovery that successful direct filtration of causticizer discharge to separate and recover the $CaCO_3$ and $Na_2O$ values is possible by observing certain limitations as to filter submergence, cake form time, wash water volume and manner of application, and air volume through the cake. Additionally temperature should be carefully controlled at least to the extent that wide variations do not occur. A desirable temperature range is from about 150° F to about 210° F. Below this range the temperature differential between the wash water and feed (at 200°–210° F.) favors undesirable precipitation of dissolved solids and above this range the washing efficiency is reduced due to water loss by evaporation.

In connection with submergence, it has been found that 40% to 60% will produce exceptional results at cake form times of 0.3 to 0.75 minutes and a feed solids concentration (dry solids basis) of from about 7% to 15%.

However, the submergence and other factors just mentioned will not, per se, give acceptable results; and they must be correlated to the special wash technique and timing. In general it may be said that a wash time of from 0.18 minute to 0.3 minute is adequate provided a flood or displacement wash is used at a volume rate of from 0.15 to 0.25 gallon of water per pound of cake solids (dry basis). This will yield a cake with an $Na_2O$ well below 1.0% by weight (dry basis) even with wide feed fluctuations; and the usual result obtainable is in the neighborhood of 0.4% which is far superior to dilution washing on a commercial basis.

If the wash water falls below about 0.15 gallon per pound solids the washing efficiency drops sharply and carbonate scale results due to the reaction between $CO_2$ and excess CaO in the strong liquor. On the other hand, if the wash water volume exceeds about 0.25 gallon per pound solids, water usage flexibility is lost; and carbonate scale formation increases sharply due to shifting of the equilibrium of the causticizing reaction whereby it is caused to go further to completion to precipitate $CaCO_3$ in the filter piping and valves.

At a wash water volume ratio of 0.2 gallon, a reduction of about three-fourths over the wash water requirement of conventional dilution wash methods is realized. This not only increase flexibility of the process by enabling more advantageous use of the water addition requirements, but also reduces the weak liquor storage requirements by an equivalent amount. This is a significant saving in equipment cost, operational expense and space.

In a typical plant producing 280 short tons (bone dry basis) per day of unbleached kraft softwood pulp, the process of the present invention, as shown in FIG. 1, compares with the usual prior process as follows:

Causticizer discharge in both processes amounts to 231 g.p.m. and strong white liquor (7.5 pounds total titratable alkali per cubic foot of liquor) required for process amounts of 181 g.p.m. in both processes.

In the filtration process of the present invention, the cake from the primary or first stage white liquor filter amounts to 156 tons (dry basis) per day which, as initially formed on the filter, contains about 20 g.p.m. residual strong white liquor, thus giving a total white liquor production of 211 g.p.m. as opposed to 181 total produced in prior sedimentation processes. Since only 181 g.p.m. is required in process, the balance of 30 g.p.m. is available to insure against dilution during cake washing and also to provide a buffer against air as hereinbefore discussed.

In the plant under discussion, 201 g.p.m. fresh water must be supplied to the system to effect necessary dilution of the white liquor to the desired 7.5 pound strength. A portion of this water, say 37 g.p.m., is utilized in green liquor dregs washing and slaker grit washing, and the balance in other sections of the flow sheet, principally in mud washing and repulping. In the prior sedimentation type flowsheet, mud washing requires a major fraction of this water which, in the plant under discussion, amounts to 130 g.p.m. in the mud washer proper and 26 g.p.m for final washing of mud on the lime mud filter.

In contradistinction to such prior practice, the present invention requires a maximum of only 56 g.p.m. for mud washing on primary filter accepting causticizer overflow. This leaves 108 g.p.m. for use in other portions of the flowsheet ahead of the causticizers. If two stage filtration is employed, about 30 to 40 g.p.m. water is required for repulping mud between filters. However, this still leaves 68 to 78 g.p.m. for use as additional water in the smelt dissolver or in the lime slaker to improve efficiency in those units or in the kiln gas scrubber. In the plant under discussion, the design provides for this water to be sent to either the smelt dissolver or slaker in proportions as may from time to time be required due to variations in the system as to lime purity, each of slaking etc. This flexibility as to use of required water reduces the quantity of weak liquor circulation in the system thus minimizing problems attendant upon such handling and also enabling the use of smaller storage facilities.

In the plant under discussion, causticizer overflow comprising feed to the filter averaged 8 to 10% solids, sulphidity was 17%, reburned lime availability averaged 85% and white liquor activity averaged 83%.

The primary filter employed was an 8 foot diameter by 10 foot face endless belt filter as shown in FIG. 3; set for 55% submergence and an average operating speed of 1.5 minutes per revolution. Strong liquor is withdrawn from the cake through about 95% of the submergence then the vacuum is temporarily cut off just prior to cake emergence and reapplied through the weak liquor valve port just after emergence when wash water is available on the cake surface.

Wash application is at the rate of .25 gallon per pound of cake solids (dry basis) applied by a weir box distributor.

Operating in this fashion produces washed cake of 65% solids at a rate of 156 bone dry tons per day and a soda ($Na_2O$) content of 0.5% which was desired in the plant. This represents 99.7% soda recovery. Filtration rates are in the high range of about 0.8 g.p.m. per square foot filter area and 0.6 pounds per minute dry solids per square foot filter area.

Cake from the primary filter can be supplied direct to the kiln or repulped, stored and refiltered. In the latter case, cakes up to 70% solids are attainable if desired.

From the foregoing, it is evident that many advantages are attainable by use of the present invention which, as noted, is based on the discovery that causticizer overflow may be filtered at economical rates provided certain critical operating ranges as to submergence, wash rate and application time, and cycle time are observed.

We claim:
1. An alkaline pulping process wherein chemicals are recovered from spent digestion liquors for reuse in the process comprising, liberating fibers from wood by dissolving the lignin binder in a caustic digestion liquor, recovering spent digestion liquor, smelting the spent digestion liquor to form a sodium bearing smelt, dissolving the smelt to form an aqueous green liquor solution, causticizing such green liquor solution with lime to form a caustic white liquor containing calcium carbonate precipitate, separating and recovering the caustic white liquor and calcium carbonate, said separation and recovery effected solely by means of vacuum filtration to withdraw caustic liquor as filtrate while forming a calcium carbonate cake, subjecting such cake to a filtration displacement wash utilizing from .15 to .25 gallon of wash liquor per pound of dry cake solids, maintaining the strength of such caustic liquor withdrawn as filtrate at about 7.5 pounds total titratable alkali per cubic foot of liquor by introducing additional water to the material undergoing treatment after smelting and before causticizing, said amount of water being at least equal to the volume of wash liquor used in washing the calcium carbonate cake on said filter means, using such caustic liquor filtrate without further treatment in the digestion of more wood, removing washed cake from said filter means, and subjecting such washed cake to calcining without further treatment to produce lime for causticizing more green liquor.

2. An alkaline pulping process wherein chemicals are recovered from spent digestion liquors for reuse in the process comprising liberating fibers from wood by dissolving the lignin binder in a caustic digestion liquor, recovering spent digestion liquor, smelting the spent digestion liquor to form a sodium bearing smelt, dissolving such smelt to form an aqueous green liquor solution, causticizing such green liquor solution with lime to form a caustic white liquor containing calcium carbonate precipitate, separating and recovering the caustic white liquor and calcium carbonate, said separation and recovery of calcium carbonate and caustic white liquor comprising the steps of introducing such mixture into a tank in which a rotary drum filter means is mounted for rotation, agitating the mixture in said tank to maintain such calcium carbonate in suspension, maintaining the upper level of such agitated mixture at an elevation such that the depth thereof is sufficient to maintain from about 40% to 60% of the area of said rotary drum filter means submerged, rotating said rotary drum filter means to continuously pass successive portions thereof into and out of submergence in such agitated mixture, maintaining a vacuum beneath the surface of said filter means during the major portion of the time of submergence to thereby withdraw caustic from the mixture as filtrate while forming a cake of calcium carbonate on the surface of said filter means, terminating the application of vacuum substantially at the point of emergence of the cake from said mixture, re-applying vacuum to the underside of the calcium carbonate cake after emergence from the mixture, distributing wash liquor uniformly over the outer surface of the cake at an elevation above that at which vacuum is re-applied to form a sheet like flow of such liquor over the cake surface toward the point of emergence, controlling the quantity of wash liquor so applied to lie in the range of from .15 to .25 gallon per pound of dry cake solids and to be sufficient to enable liquor flow over the cake surface under the influence of re-applied vacuum at least to the point of re-application of vacuum but insufficient to enable the flowing liquor to reach the upper level of the mixture in the tank prior to being withdrawn as filtrate, using such caustic liquor filtrate without further treatment in the digestion of more wood, maintaining the strength of the caustic liquor withdrawn as filtrate at about 7.5 pounds total titratable alkali per cubic foot of liquor by introducing additional water to the material undergoing treatment after smelting and before causticizing, such amount of water being at least equal to the volume of wash liquor used in washing the calcium carbonate cake on said filter means, removing washed calcium carbonate cake from said filter means and subjecting said washed cake to calcining without further treatment to produce lime for causticizing more green liquor.

3. An alkaline pulping process wherein chemicals are recovered from spent digestion liquors for reuse in the process comprising liberating fibers from wood by dissolving the lignin binder in caustic digestion liquor, recovering spent digestion liquor, smelting the spent digestion liquor to form a sodium bearing smelt, dissolving such smelt to form an aqueous green liquor solution, causticizing such green liquor solution with lime to form a caustic white liquor containing calcium carbonate precipitate, separating and recovering the caustic white liquor and calcium carbonate, said separation and recovery of calcium carbonate and caustic white liquor including the steps of introducing such mixture into a tank in which a rotary drum filter means is mounted for rotation, maintaining the solids concentration of such mixture in a range of from about 7% to 15% by weight, agitating such mixture to maintain the calcium carbonate in suspension, maintaining the upper level of such agitated mixture at an elevation such that the depth thereof is sufficient to maintain from about 40% to 60% of the area of said rotary drum filter means submerged, rotating said rotary drum filter means to continuously pass successive portions thereof into and out of submergence in said agitated mixture, maintaining a vacuum beneath the surface of said filter means during the major portion of the time of submergence to thereby withdraw caustic from the mixture as filtrate while forming a cake of calcium carbonate on the surface of the filter means, controlling the rate of rotation of said rotary drum filter means to yield a cake of from about ¼ inch to about ¾ inch thickness, terminating the application of vacuum substantially at the point of emergence of the cake from said mixture, re-applying vacuum to the underside of the calcium carbonate cake after emergence from the mixture, distributing wash liquor at a temperature maintained in the range of from about 150° F. to about 210° F. uniformly over the outer surface of the cake at an elevation above that at which vacuum is re-applied to form a sheet like flow of such liquor over the cake surface toward the point of emergence whereby displacement washing is effected and air is prevented from entering said cake until residual caustic liquor is removed, controlling the quantity of wash liquor so applied to be from .15 to .25 gallon per pound of dry cake solids and sufficient to enable liquor to flow over the cake surface under the influence of re-applied vacuum at least to the point of re-application of vacuum but insufficient to enable the flowing liquor to reach the upper level of the mixture in the tank prior to being withdrawn as filtrate, withdrawing wash filtrate separately from the caustic liquor filtrate, effecting at least partial dilution of the caustic liquor withdrawn as filtrate to yield a liquor maintained at a strength of about 7.5 pounds total titratable alkali per cubic foot of liquor by introducing additional water to the material undergoing treatment after smelting and before causticizing, said amount of water being at least equal to the volume of wash liquor used in washing the calcium carbonate cake on said filter means, returning such caustic filtrate without further treatment to digest more wood, and removing the washed cake from said filter means.

4. The process of claim 3 in which the rate of rotation of said rotary drum filter is controlled to subject each of the successive filter sections thereof to vacuum during submergence for a time period of from .3 to .75 minute.

5. The process of claim 3 in which wash liquor is distributed over the outer surface of the cake for a time period of from .18 to .3 minute.

6. The process of claim 3 in which the discharged cake is subjected to calcining prior to any further treatment and the resulting lime is slaked and reacted with sodium bearing green liquor.

References Cited by the Examiner

UNITED STATES PATENTS

| | | | |
|---|---|---|---|
| 963,186 | 7/1910 | Trump | 210—217 |
| 1,906,886 | 5/1933 | Richter | 23—48 X |
| 2,062,255 | 11/1936 | Brooks et al. | 23—66 |
| 2,211,908 | 8/1940 | O'Connor | 23—66 |
| 2,552,183 | 5/1951 | Knight | 23—48 |
| 2,765,085 | 10/1956 | Strindlund | 210—402 X |

DONALL H. SYLVESTER, *Primary Examiner.*

H. R. CAINE, *Assistant Examiner.*